March 11, 1924.
W. W. STAUFFER
DOUGH CUTTER
Filed Oct. 27, 1922
1,486,810
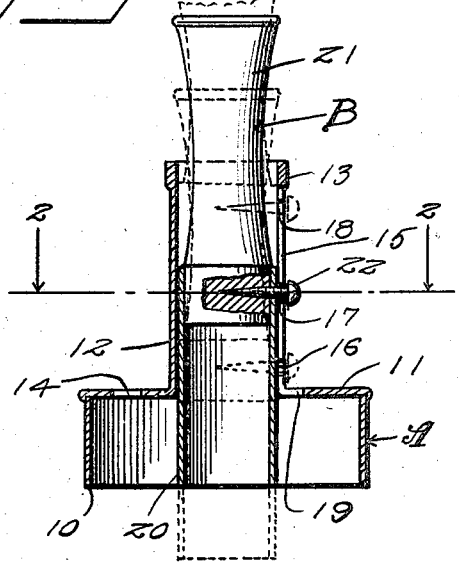
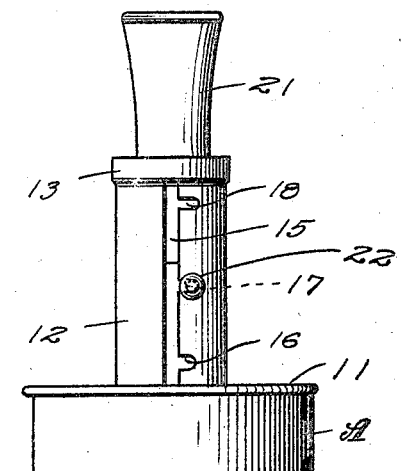
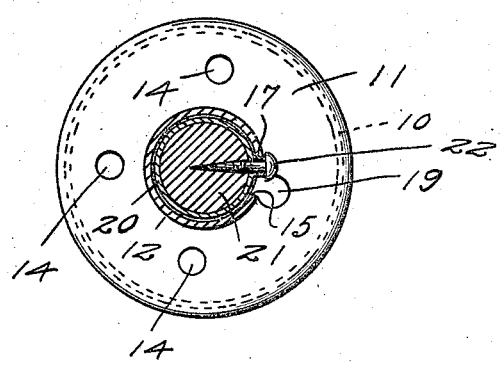
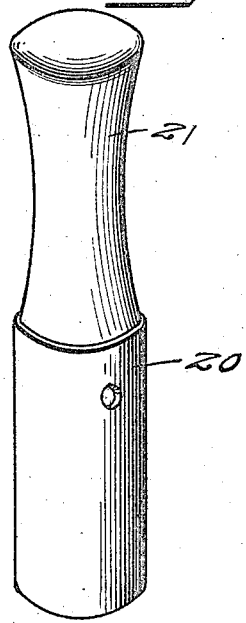
Inventor
W. W. Stauffer.
By
Attorney Patented Mar. 11, 1924.

1,486,810

UNITED STATES PATENT OFFICE.

WALLACE W. STAUFFER, OF AKRON, INDIANA.

DOUGH CUTTER.

Application filed October 27, 1922. Serial No. 597,332.

*To all whom it may concern:*

Be it known that I, WALLACE W. STAUFFER, a citizen of the United States, residing at Akron, in the county of Fulton and State of Indiana, have invented certain new and useful Improvements in Dough Cutters; and I do hereby declare the following to be a full, clear, and exact description of the invention, such as will enable others skilled in the art to which it appertains to make and use the same.

This invention relates to a dough cutter.

It is aimed to provide a novel, strong, durable, simple and inexpensive cutter for cake and biscuit dough and which is capable of adjustment to cut articles of different shapes and sizes.

Another object is to provide such a construction embodying a main cutter having a tube extending therefrom and also embodying a second or tubular cutter adjustable longitudinally in the tube and capable of fastening in different positions.

A still further object is to provide a construction as just suggested in which a handle for the tubular cutter is utilized and fastened in place by a stud or the like adapted to engage notches in the tube so as to serve as the fastening means for the auxiliary cutter.

Various additional objects and advantages will become apparent from a consideration of the description following taken in connection with accompanying drawings illustrating one practical embodiment.

In said drawings:

Figure 1 is a vertical sectional view taken substantially centrally and longitudinally of the article;

Figure 2 is a transverse sectional view taken on the line 2—2 of Figure 1 but through the entire article and along a plane passing through the fastening stud and looking towards the cutting end of the article;

Figure 3 is a side elevation of the device, and

Figure 4 is a detail perspective view of the auxiliary cutter alone.

Like reference characters designate like or similar parts in the different views.

Referring specifically to the drawings, a main cutter is employed which is generally designated A and specifically has a depending annular or endless cutting wall 10 extending from a plate or disk 11 having a central opening therethrough which is bordered by and from which extends a tube 12. Said tube at its upper or free end is reinforced by a ferrule or the like as at 13. Air release openings 14 may be provided through the plate or disk 11 and a slot 15 extends longitudinally of the wall of the tube 12 and has lateral branches 16, 17 and 18. Said slot 15 is closed at the top by the ferrule 13 and an enlarged opening or slot 19 is provided through the plate or disk 11 at the base of slot 15.

An auxiliary cutter is generally shown at B and may consist of a cylindrical cutter 20, of less diameter than the wall 10 and being slidable longitudinally of and turnable axially of and within the tube 12. The parts of the main cutter A and the cylindrical cutter 20 may be of tin or other inexpensive material and a handle or post 21, of wood or other material, may extend part way into the cylindrical cutter 20 and be fastened therein by means of a screw 22 passing through the cutter 21 and into the post. The head of the screw 22 is spaced from the cutter 20 and the shank of the screw is adapted to pass through the slot 15 and into the branches 16, 17 and 18, selectively. The enlargement 19 enables the head of the screw 22 to pass through the plate or disk 11 and the shank of the screw to cooperate with the slot 15. The screw 22 thus serves as a securing stud.

In using the article, biscuits or cakes of a small size may be cut when the stud 22 is located in the branch slot 16 since the cylindrical cutter 20 depends below the wall 10. This position is suggested by dotted lines in Figure 1. When the stud 22 is in slot 17, as shown in full lines in Figure 1, the cutter 20 and wall 10 cooperate to form a doughnut cutter. The dot-dash lines in Figure 1 illustrate the position of the parts when the stud 22 is located in the branch slot 18 and in which position large biscuits or cakes may be cut without interference by the cutter 20, inasmuch as the latter is raised above the wall 10. During all of the cutting operations, air is released through the openings 14.

In addition to the parts being slidable and axially turnable one on the other for engagement and disengagement of the stud 22 in the branch slots 16, 17 and 18, the opening 19 enables the parts to be detached from each other so that they may be readily washed or cleansed.

It will be realized that the article provides an exceedingly strong and simple cutter and is inexpensive to manufacture and particularly avoids parts which are likely to readily break, become loose or fall apart.

As merely one practical embodiment has been illustrated and described, it is to be understood that changes in the details may be resorted to provided they fall within the spirit and scope of the invention.

I claim as my invention:—

1. A cutting article of the class described including a cutter having a depending cutting wall, a disk from which said wall depends, a tube rising from said disk and provided with an elongated slot and branch slots extending therefrom, a cutter slidably and axially movable in said tube, a handle for the last mentioned cutter, and a stud securing said handle to and extending from the second mentioned cutter for movement in and coaction with said elongated slot and branches.

2. A cutting article of the class described including a cutter having a disk, a depending cutting wall on said disk, said disk having an opening therethrough and a tube about said opening and extending from the side of said disk opposite to the cutter, said tube having an elongated slot and branch slots therethrough, a ferrule on said tube closing one end of the elongated slot, a tubular cutter movable axially and slidably in said tube, a handle for the tubular cutter, a stud to fasten said handle in said tubular cutter, and said stud being movable in and cooperating with said elongated slot and branch slots.

In testimony whereof I affix my signature in presence of two witnesses.

WALLACE W. STAUFFER.

Witnesses:
J. R. AMBRUSTER,
C. H. STAUFFER.